(12) United States Patent
Foltin (10) Patent No.: US 10,579,867 B2
(45) Date of Patent: Mar. 3, 2020

(54) METHOD AND DEVICE FOR DETECTING AN OBJECT IN A VEHICLE

(71) Applicant: Robert Bosch GmbH, Stuttgart (DE)

(72) Inventor: Johannes Ludwig Foltin, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 15/873,233

(22) Filed: Jan. 17, 2018

(65) Prior Publication Data

US 2018/0204056 A1 Jul. 19, 2018

(30) Foreign Application Priority Data

Jan. 17, 2017 (DE) .................... 10 2017 200 607

(51) Int. Cl.
| | |
|---|---|
| *G06K 9/00* | (2006.01) |
| *G06T 7/73* | (2017.01) |
| *G06T 7/586* | (2017.01) |
| *B60R 22/48* | (2006.01) |
| *G06K 9/20* | (2006.01) |
| *B60R 21/015* | (2006.01) |

(52) U.S. Cl.
CPC .......... *G06K 9/00369* (2013.01); *B60R 22/48* (2013.01); *G06K 9/00201* (2013.01); *G06K 9/00261* (2013.01); *G06K 9/00288* (2013.01); *G06K 9/00838* (2013.01); *G06K 9/2027* (2013.01); *G06K 9/2063* (2013.01); *G06T 7/586* (2017.01); *G06T 7/73* (2017.01); *G06T 7/75* (2017.01); *B60R 21/01512* (2014.10); *B60R 21/01556* (2014.10); *G06K 9/00302* (2013.01); *G06T 2207/10016* (2013.01); *G06T 2207/10024* (2013.01); *G06T 2207/10152* (2013.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 2003/0179083 A1* | 9/2003 | Wallace | B60R 25/1004 340/426.1 |
| 2007/0176402 A1* | 8/2007 | Irie | G06K 9/00362 280/735 |
| 2007/0206836 A1 | 9/2007 | Yoon et al. | |
| 2017/0193690 A1* | 7/2017 | Ha | G06T 15/80 |

OTHER PUBLICATIONS

Image Segmentation, obtained from Wikipedia.org on Oct. 4, 2019.

* cited by examiner

*Primary Examiner* — Leon Viet Q Nguyen
(74) *Attorney, Agent, or Firm* — Norton Rose Fulbright US LLP; Gerard Messina

(57) ABSTRACT

A method includes obtaining by an image-recording device of a vehicle first and second images that respectively represent first and second shadings on an object in the vehicle generated by illumination of the object by an illumination device of the vehicle at first and second illumination settings, respectively; processing the images, thereby identifying the first shading and the second shading; based on the identified first shading and second shading, detecting at least one of a surface structure and a position of the object; and based on the detected at least one of the surface structure and position, a least one of controlling a restraint and outputting a warning.

14 Claims, 3 Drawing Sheets

METHOD AND DEVICE FOR DETECTING AN OBJECT IN A VEHICLE

CROSS-REFERENCE TO RELATED APPLICATIONS

The present application claims priority under 35 U.S.C. § 119 to DE 10 2017 200 607.2, filed in the Federal Republic of Germany on Jan. 17, 2017, the content of which is hereby incorporated by reference herein in its entirety.

FIELD OF THE INVENTION

The present invention is based on a device, method, and/or computer program for detecting an object in a vehicle.

BACKGROUND

A vehicle is able to be equipped with a belt-warning system, also known as a seatbelt reminder. For example, seat mats for measuring the seat occupancy can be used in this context because only an occupied seat is usually relevant for a belt warning. The seat mats, for instance, can distinguish between different groups of persons, such as between a baby in an infant seat, a child, or an adult. In addition to seat mats, belt-buckle sensors for detecting an unlocked or locked state of a belt buckle are known as well, as are camera systems for monitoring the passenger compartment of a vehicle.

SUMMARY

Against this background, an approach presented here introduces a method for detecting an object in a vehicle, a device that uses this system, and a corresponding computer program.

According to an example embodiment, a method is provided for detecting an object in a vehicle. The vehicle includes an illumination device for illuminating the object at different illumination settings and an image-recording device for recording images of the object. The method includes reading in a first image that represents a first shadow cast on the object, which was created when the object was illuminated using a first illumination setting, and reading in a second image that represents a second shadow cast on the object, which was created when the object was illuminated using a second illumination setting. The method further includes processing the first image and the second image in order to detect a surface structure and/or a position of the object on the basis of the first shadow and the second shading.

The object can be a vehicle passenger, in particular a face of the vehicle passenger, or a child seat or an infant carrier, for instance. An illumination device, for example, can be a conventional passenger-compartment illuminator for illuminating the object using visible light and/or infrared light. The illumination device can include a plurality of illumination units that are placed at different locations in the passenger compartment, for instance, so that the object is able to be illuminated from different directions. An image-recording device, for example, can be a camera for monitoring the vehicle-passenger compartment. The first and the second illumination settings can differ from each other, such as with regard to a light distribution created by the illumination device in the passenger compartment. Shading can be both a continual brightness characteristic and a hard shadow. A continual brightness characteristic featuring a constant reflection factor can be produced by changing the angle of incidence on the surface or by changing the object angle relative to the illumination unit, for example. In the case of a spherical surface, a change in the object angle, and thus also a change in the brightness, occurs on a continual basis and can also be referred to as a cosine dependence. According to the understanding in the present case, the shading can depend on the intensity of the incident light, the direction-dependent reflection factor, and the angle of incidence.

The approach presented here is based on the understanding that sensing in the passenger compartment of a motor vehicle in darkness is able to be improved by an illumination of the passenger compartment that varies in a synchronized manner. Through an individual actuation of a passenger compartment illumination with a synchronization of an image evaluation, it is possible to evaluate the passenger-compartment situation via differently illuminated, and thus differently shaded, images. In an advantageous manner, an infrared illumination of the passenger compartment in darkness can be unnecessary if the classic passenger-compartment illumination is actuated so as to create different illumination situations that allow for a differentiation among flat 2D objects and raised 3D objects. The illumination device, for example, is also able to be adapted to a sensitivity of a camera. Utilizing an existing passenger-compartment illumination for passenger-compartment sensing makes it possible to dispense with an additional auxiliary illumination. By utilizing the approach presented here, which employs infrared light, it is possible to differentiate between flat 2D objects and raised 3D objects through the different illuminations, and/or to achieve an illumination of the passenger-compartment scene that is more optimal for the evaluation.

Knowledge of the position of the light sources not only makes it possible to ascertain the surface structure from the shading but also to estimate the position of the object at the same time. This is particularly possible in the case of punctiform light sources (e.g., an LED light source) and a short distance between the head and the light source. A slight change in position then has a strong effect on the shadings. As a result, a confirmation that the object is a three-dimensional object can be obtained in a first step, whereupon an estimate of the position of this object is able to be ascertained in a following second step. However, this two-step process is not mandatory since an estimate of the position could also be carried out simply on the assumption of a 3D object, without confirmation.

According to an example embodiment, a three-dimensional model of the object is able to be created in the step of processing in order to detect the surface structure on the basis of the three-dimensional model. For example, the three-dimensional model can be generated in a pixel-wise manner by ascertaining a respective distance between pixel points allocated to the object and the image-recording device. This specific embodiment allows for a precise and reliable detection of the surface structure of the object. Additionally or alternatively, the position of the object is able to be measured. For instance, such a position can be ascertained in an especially satisfactory manner if the distance between each pixel and an adjacent pixel is known, which is advantageous for other application cases in the field of passive safety. Infrared light can most advantageously be used for the illumination in such a case.

According to an example embodiment, in the step of processing, at least one brightness-threshold value is used to ascertain a first brightness characteristic that represents the first shading, or—additionally or alternatively—a second brightness characteristic that represents the second shading.

The surface structure is able to be detected on the basis of at least one of the two brightness characteristics. This specific embodiment makes it possible to reduce the computational complexity during the detection of the surface structure, so that the efficiency of the method is able to be increased.

In the step of processing, it is advantageous if a distance between the object and the illumination device is ascertained in a pixel-wise manner in order to detect the surface structure. In this way the surface structure is able to be detected at the highest possible resolution.

The present method can furthermore include a step of evaluating the surface structure in order to detect a vehicle passenger or a child seat as the object. For instance, the object is able to be detected as the vehicle passenger or the child seat with the aid of a suitable classification. This makes it possible to distinguish between vehicle passengers and child seats when detecting the object.

In addition, the first image or the second image can represent an image of the object recorded when the object was illuminated by visible light. Alternatively, both images can represent a respective image of the object recorded when the object was illuminated by visible light. This makes it possible to detect the surface structure using a conventional passenger-compartment illumination, so that an additional illumination device for detecting the surface structure is able to be dispensed with.

Moreover, the method can include a step of actuating the illumination device or, additionally or alternatively, of actuating the image-recording device as a function of a position of at least one door of the vehicle, which increases the efficiency of the object detection.

According to one further example embodiment, at least one third image is read in during the read-in step. The third image can represent a third shading of the object created when the object was illuminated at a third illumination setting. Accordingly, in the step of processing, the third image can be processed in order to detect the surface structure, thereby making it possible to detect the surface structure on the basis of a plurality of different shadings of the object. The reliability of the method is able to be further improved in this manner.

This method, for example, can be implemented in software or hardware or in a mixed form of software and hardware, such as in a control unit.

In addition, according to an example embodiment, a device executes, actuates, or implement the steps of a method as described herein. For this purpose, the device can include at least one computer unit for processing signals or data, at least one memory unit for storing signals or data, at least one interface with respect to a sensor or with respect to an actuator for reading in sensor signals from the sensor or for outputting data or control signals to the actuator, and/or at least one communications interface for reading in or outputting data, which are embedded in a communications protocol. The computer unit, for example, can be a signal processor, a microcontroller or the like, and the memory unit could be a flash memory, an EPROM or a magnetic memory device. The communications interface can be designed to read in data in a wireless and/or line-bound manner or to output such data accordingly. A communications interface that is able to read in or output line-bound data can read in these data, e.g., electrically or optically, from a corresponding data-transmission line or output these data to a corresponding data-transmission line.

In this context, a device can be an electrical device which processes sensor signals and outputs control and/or data signals as a function of such processing. The device can include an interface that could be developed in the form of hardware and/or software. In a hardware design, the interfaces can be part of a system ASIC, which encompasses a wide variety of functions of the device. However, it is also possible that the interfaces are discrete, integrated switching circuits or are at least partly made up of discrete components. In a software design, the interfaces can be software modules, which are provided on a microcontroller in addition to other software modules, for instance.

In an advantageous example embodiment, the device carries out a control of the vehicle. For example, in an example embodiment, the device can access sensor signals such as acceleration, pressure, steering-angle, or environmental sensor signals for this purpose. The actuation takes place via actuators such as brake actuators or steering actuators or via an engine-control unit of the vehicle.

In an advantageous example embodiment, an adaptation of a protection means of the vehicle, such as the trigger condition of airbags or belt pretensioners, takes place. In a further advantageous example embodiment, the adaptation of information/warning functions is carried out, such as a belt-warning function or airbag-deactivation information if an infant seat is used on the seat.

According to an example embodiment, a computer program product or a computer program having program code stored on a machine-readable carrier or in a memory medium such as a semiconductor memory, a hard-disk memory or an optical memory, is used for carrying out, implementing and/or actuating the steps of the present method as recited in one of the previously described specific embodiments, in particular when the program product or the program is executed on a computer or on a device.

Exemplary embodiments of the present invention are illustrated in the drawings and described in greater detail in the following description.

DETAILED DESCRIPTION

In the following description of advantageous exemplary embodiments of the present invention, the same or similar reference numerals are used for the elements that are shown in the different figures and that have a similar effect, and a repeated description of these elements has been omitted.

Figure 1:
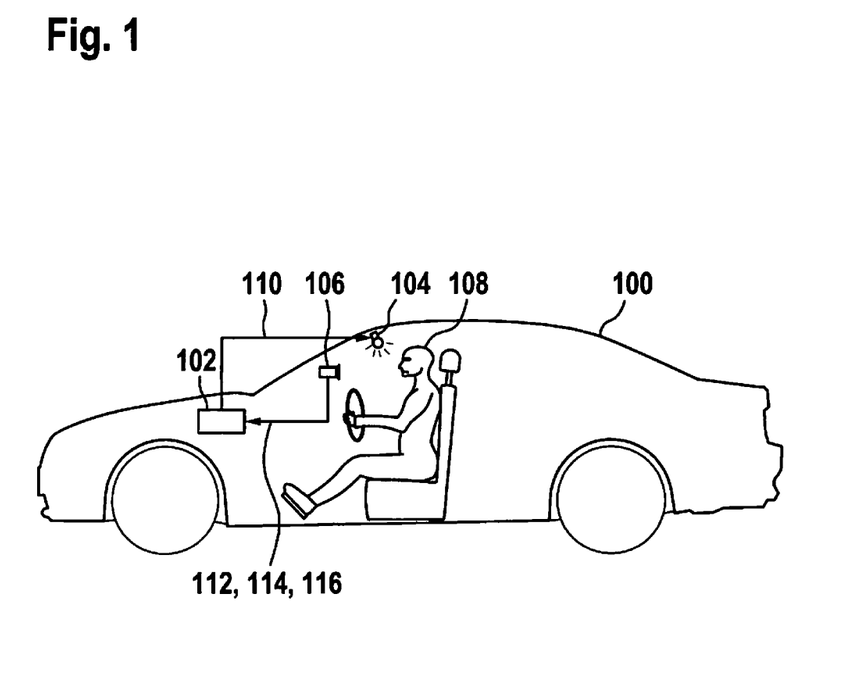
FIG. 1 is a schematized representation of a vehicle including a device according to an example embodiment of the present invention.

FIG. 1 shows a schematized representation of a vehicle 100 equipped with a device 102 according to one exemplary embodiment. Device 102 is connected to an illumination device 104 for illuminating a passenger compartment of vehicle 100, such as a conventional passenger-compartment illumination for illuminating the interior space using visible light. Device 102 is also connected to an image-recording device 106, such as a passenger-compartment monitoring camera, for recording images of the passenger compartment. As an alternative, illumination device 104 is designed to illuminate the passenger compartment with light in the invisible wavelength range. A vehicle passenger 108, who is illuminated by illumination device 104 at different illumination settings, is located in vehicle 100. The illumination settings, for example, differ from one another in that an object to be illuminated, in this case vehicle passenger 108 by way of example, is illuminated by illumination device 104 from different directions, depending on the illumination setting, so that different shadings (which, in other words, can be understood as different light intensities or a different number of photons per area unit in this instance) are created on a surface structure of the object, which is characterized by the face of vehicle passenger 108 in FIG. 1. Depending on the exemplary embodiment, the illumination settings additionally or alternatively differ from each other by a light intensity. For example, device 102 is developed to actuate illumination device 104 by outputting a corresponding control signal 110 in such a way that vehicle passenger 108 is sequentially illuminated at a first illumination setting as well as at a second illumination setting that differs from the first illumination setting, so that a first shading is created on the face of vehicle passenger 108 in an illumination at the first illumination setting, and a second shading is created in an illumination at the second illumination setting. Image-recording device 106 is developed to record at least one first image 112 when vehicle passenger 108 is illuminated at the first illumination setting, and to record at least one second image 114 when vehicle passenger 108 is illuminated at the second illumination setting, and to transmit the two images 112, 114 to device 102. Device 102 processes the two images 112, 114 in order to suitably reconstruct (structure from shading) the surface structure representing the face of vehicle passenger 108 or an object on the basis of the first shading imaged in first image 112 or the second shading imaged in second image 114. For instance, device 102 is developed to perform an object classification or a personal/individual identification on the basis of the two shadings, through which the object, represented by the shadings in the two images 112, 114, is unequivocally identifiable as a face. In particular in a personal or individual identification, a restraint means, for instance, is able to be adapted or adjusted in an optimal manner.

According an example embodiment, device 102 is designed to actuate illumination device 104 in such a way that vehicle passenger 108 is additionally illuminated using at least one third illumination setting, which differs from the first and the second illumination settings, so that a corresponding third shading is produced on the face of vehicle passenger 108. Accordingly, image-recording device 106 records a corresponding third image 116 of vehicle passenger 108 when vehicle passenger 108 is illuminated at the third illumination setting, in which the third shading is therefore imaged. Device 102 then uses third image 116 in addition to the two images 112, 114, in order to detect vehicle passenger 108.

Figure 2:
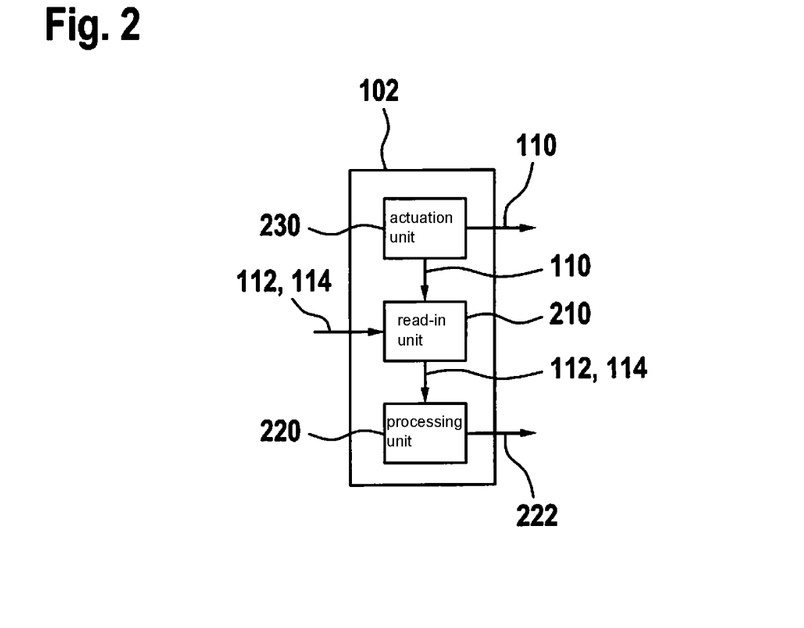
FIG. 2 is a schematized representation of a device according to an example embodiment of the present invention.

FIG. 2 shows a schematized illustration of a device 102 according to an example embodiment, for instance a device as it was described in the previous text on the basis of FIG. 1. Device 102 includes a read-in unit 210 for reading in first image 112 and second image 114 via an interface with respect to the image-recording device focused on the vehicle passenger. Read-in unit 210 is designed to transmit the two images 112, 114 to a processing unit 220 of device 102, which is designed to process the two images 112, 114 in such a way that the surface structure of the face of the vehicle passenger is unequivocally identified on the basis of the shadings imaged in the two images 112, 114. As a result of the processing, processing unit 220 outputs a corresponding item of detection information 222, which, for example, represents the result of an allocation of the object, illuminated by the illumination device, to a class "vehicle passenger," a personal or individual identification of a specific vehicle passenger for adjusting parameters of restraint means, for example, or a class "child seat." A control unit of the vehicle, for instance, can further process detection information, so that restraint means are able to be triggered in a selective manner, e.g., as a function of the passengers, in the event of an imminent collision.

According to an example embodiment, device 102 includes an actuation unit 230 for actuating the illumination device of the vehicle by outputting control signal 110. Read-in unit 210 reads in the two images 112, 114, for instance in response to the output of control signal 110, which is sketched by an arrow between the two units 210, 230 in FIG. 2.

More specifically, actuating unit 230 is developed to actuate the illumination device as a function of a position of at least one door of the vehicle, e.g., as a function of a closed state or an open state of the at least one door.

Optionally, actuating unit 230 is designed to additionally actuate the image-recording device of the vehicle in an appropriate manner.

Figure 3:
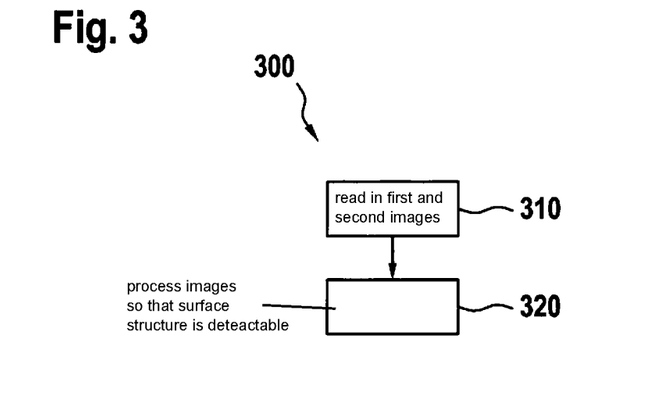
FIG. 3 is a flowchart that illustrates of a method device according to an example embodiment of the present invention.

FIG. 3 is a flowchart that illustrates a method 300 according to an example embodiment. Method 300 for detecting an object in a vehicle can be carried out using a device as previously described with the aid of FIGS. 1 and 2, for example. In a step 310, the first image and the second image are read in. In a step 320, the two images are processed so that the surface structure of the object illuminated inside the vehicle is detectable on the basis of the shadings represented by the two images.

Figure 4:
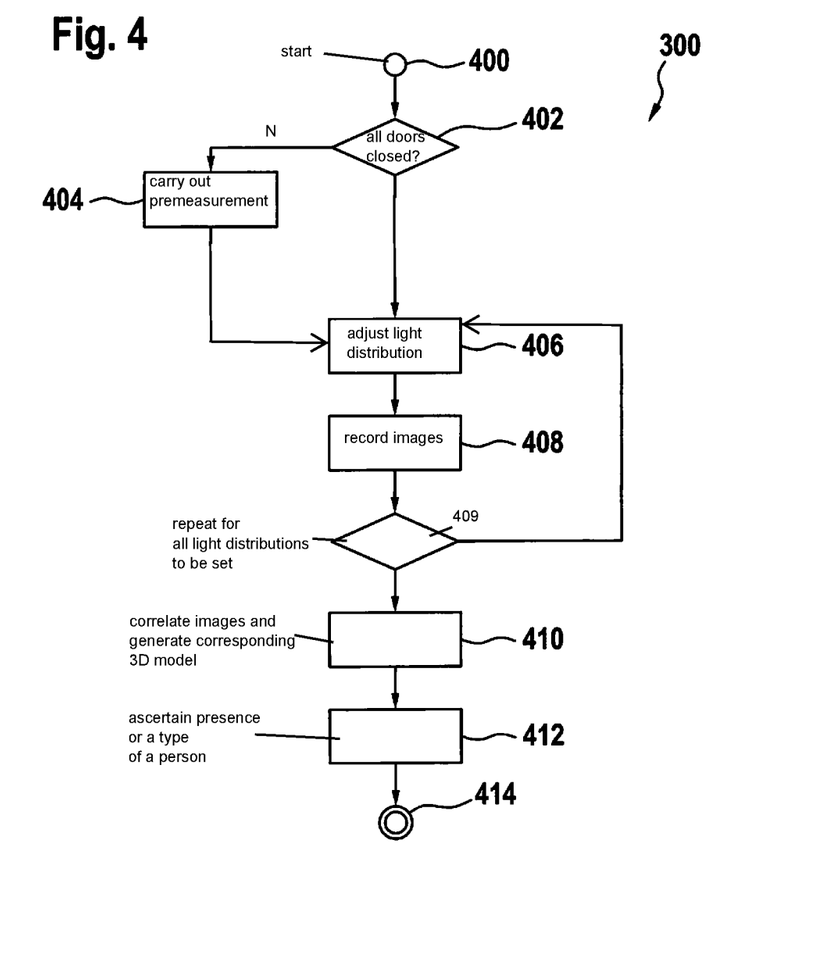
FIG. 4 is a flowchart that illustrates of a method device according to an example embodiment of the present invention.

FIG. 4 is a flowchart of a method 300 according to an example embodiment, e.g., a method as described in the preceding text on the basis of FIG. 3, where method 300 begins with a step 400. In a further step 402, it is checked whether all doors of the vehicle are closed. If it turns out that the doors are not closed, then a premeasurement is carried out in a step 404, during which the object to be detected in the interior space of the vehicle is illuminated at different illumination settings with the aid of the illumination device even while the door is open. On the other hand, if it is shown in step 402 that the doors are closed, then a certain light distribution will be adjusted in the passenger compartment in a step 406 with the aid of the illumination device, for instance by activating the first or the second illumination setting of the illumination device. In a step 408, the recording of corresponding images, such as the first image and the second image, takes place. In a step 410, the two images are correlated with each other, for instance in order to computationally replicate the surface structure of the illuminated object by generating a corresponding 3D model. In a step 412, a presence or a type of person is optionally ascertained on the basis of the 3D model that was created in step 410. Both steps 410, 412 can be sub-steps of processing step 320 described in the previous text with the aid of FIG. 3.

The two steps 406, 408 are repeated for all light distributions to be set (step 409), for instance, which is indicated by a corresponding arrow in FIG. 4.

Method 300 ends in a step 414.

According to an example embodiment, the evaluation begins as soon as the doors of the vehicle are closed. This ensures that no further persons will enter. The various light distributions are started after the doors have been closed. In addition to a hard activation and deactivation of light distributions, dimming is also an option in an effort to distract passengers as little as possible. Since the image recording usually takes only a few milliseconds, the switchover in the light distributions can take place in a virtually unnoticeable manner. For the most part, the passengers then remain unaware of the measurement. The measurements can be carried out in an even more unobtrusive manner by selecting an advantageous sequence when switching off the passenger-compartment illumination. Once all light distributions have been measured, and possibly also measured repeatedly in the event that a measurement was ambiguous, the light distributions are mathematically correlated. The presence of a person on a seat is then inferred from the images that were computed to form a three-dimensional representation, for instance.

A classification, e.g., a child, an infant seat or an adult, is possible in addition. For example, a premeasurement is carried out while the doors are still open. It can include the same steps as those after the closing of the doors. The long period that is available while the doors are open is advantageous for this purpose. The person who closes the door moves while closing the door, which makes it possible to detect the respective pose or facial expression of the person with the aid of a corresponding movement classifier. The detection is easy because of the long time period possible in the premeasurement. Once the door is closed, whether any change has occurred in the previously recorded scene is measured.

Figure 5:
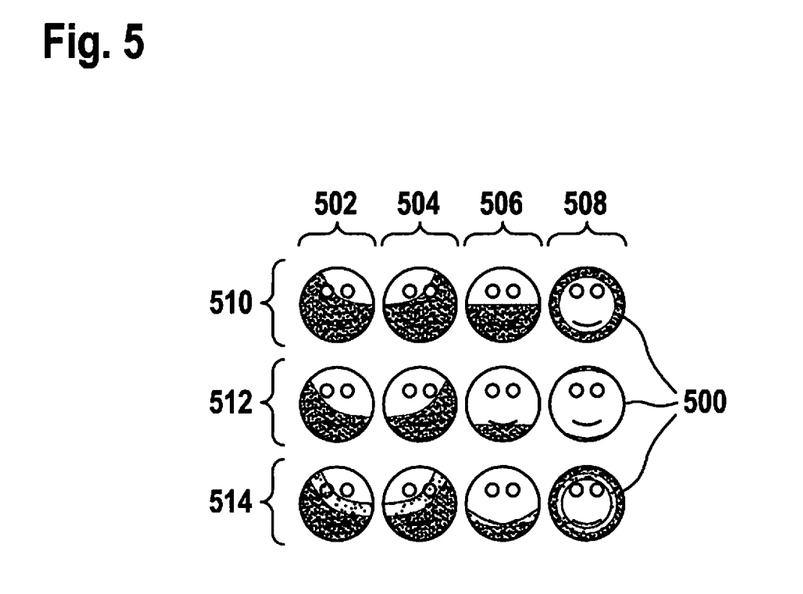
FIG. 5 is a schematic representation of a face under different illumination conditions in a vehicle of an example embodiment of the present invention.

FIG. 5 shows a schematic illustration of a face 500 at different illumination conditions in a vehicle. Face 500 is the face of the vehicle passenger from FIG. 1, for instance. A total of twelve drawings of the face are shown, which are arranged in four columns 502, 504, 506, 508 and three lines 510, 512, 514. These are recordings of a person who is seated in the center of a rear seat row of the vehicle, for example. The terms 'front', 'rear', 'left' and 'right' used in the following text relate to the driving direction (the driver is seated in the front on the left).

In the recordings in first column 502, the left rear passenger-compartment illumination is switched on, so that face 500 is illuminated from the top left. Second column 504 represents an illumination situation in which a right rear passenger-compartment illumination is activated, so that face 500 is illuminated from the top right. In third column 506, both the left rear illumination and the right rear illumination are active, so that face 500 is illuminated from both sides from above. In fourth column 508, a front illumination is active, whereby face 500 is illuminated from the front.

Corresponding shadings in the various recordings of face 500 schematically sketch the different shadings on face 500 that are created according to the respective illumination situations.

In first line 510, face 500 is shown the way it is recorded by the image-recording device, for example. The light-to-dark transition is soft and continuous. In order to illustrate the illumination, a type of binarization of the gray-value characteristic was performed in second line 512. In the image evaluation, this is done by forming a threshold value of a brightness value, for instance. In addition, shading of a nose of the vehicle passenger has been sketched in second line 512 in order to illustrate the possibilities of a three-dimensional evaluation of the recordings.

Lines having an identical brightness, as they are measurable in the case of a spherical object such as a face, for example, are plotted in third line 514. Instead of a binarization, a plurality of threshold values is also an option for ascertaining the respective shadings in the form of corresponding brightness characteristics. The brightness characteristics are indicated by different lines.

Figure 6:
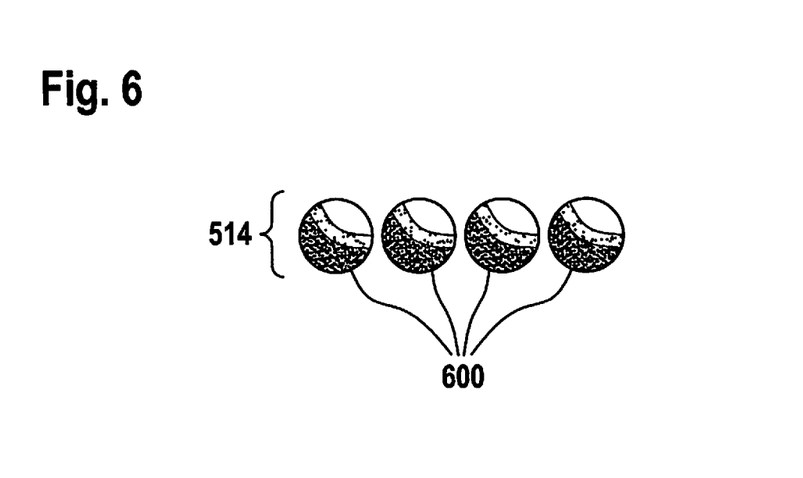
FIG. 6 is a schematized representation of a flat, inhomogeneous object with thresholds of the same brightness in an example embodiment of the present invention.

FIG. 6 shows a schematized illustration of a flat, inhomogeneous object having thresholds of the same brightness. Shown is third line 514 from FIG. 5. In contrast to FIG. 5, however, the recorded object is not a face but a flat object 600. Object 600 actually does have a color characteristic and a gray-value characteristic by which lines having different brightnesses can be found, but due to the two-dimensional surface of object 600, no appreciable change in these lines is obtained even under different illumination conditions.

In the following text, different example embodiments of the approach introduced here will be described once again in different words.

As a rule, a passive illumination of the passenger-compartment of the vehicle by the headlights of other vehicles or by streetlights is not sufficient for the continual evaluation because the external light is not always available. Therefore, the approach presented here utilizes the passenger-compartment illumination of the vehicle, possibly as a supplementation of the continual evaluation, especially during a standstill or shortly before the startup of the vehicle, for example.

According to one example embodiment, an illumination situation inside the vehicle is varied with the aid of the illumination device, and at least one image is recorded of each illumination situation. The shading is always slightly different as a result of the varying illumination situations. For one, this has the advantage that an optimally illuminated image is able to be selected and utilized for the face recognition, and for another, that a precise reconstruction of a three-dimensional scene from the shadings is possible.

The variation of the brightness in the vehicle passenger compartment takes place after the vehicle has been entered, for example. This is done because the activation of the passenger-compartment illumination is something that is already familiar.

In some instances, the image processing finds it difficult to perceive faces as faces. This is true especially when a single image is involved or only very few images were recorded using the same illumination. Varying the illumination situation increases the likelihood of finding a suitable combination of an individual face, pose, and facial expression as well as illumination, because illumination parameters are actually varied but the face and pose of the vehicle passenger remain essentially the same. Without such a variation of the illumination, the detection options would be limited. If the identification was not clear during a detection, perhaps because a face was detected in only one of a plurality of illumination situations, a longer illumination series, for example, is selectively started for the particular seat position, which increases the likelihood that the vehicle passenger will move and change his or her facial expression or pose.

In addition to a higher detection rate in the facial recognition, the different illumination can also be helpful in the individual identification of a person in the context of individual occupant safety (IOS). For example, different aspects, such as a nose-eye area, are able to be evaluated even more reliably because of the different illumination, which provides a likelihood of a correct identification even in darkness and without an additional infrared illumination.

The reconstruction of the 3D structure from the shading utilizes the fact that in the illumination of a three-dimensional object, a shadow is formed on the side that faces away from the light. A static illumination has the disadvantage of making it impossible to distinguish a shadow (low reflection due to a low light incidence) from a dark spot (low reflection due to heavy light absorption). A photograph can therefore be taken for a person because the dark color of the shadow in the photograph (greater absorption) is unable to be distinguished from a real shadow (low reflection).

Since the illumination situation is known from the actuation of the illumination device, the variation of the illumination side makes it possible to find out what has been caused by the shading and what was caused by the reflection (brightness) of the material.

For example, by varying the illumination conditions, a 3D model is estimated from the 2D recordings (in the most critical case even from the immobile 2D recordings), and the illuminated object is thereby reliably identified as a person or also as an infant seat or a similar item.

According to an example embodiment, a reflection factor or a distance is ascertained through knowledge of a light distribution of the passenger-compartment illumination, by a comparison of the isolux curves, for instance as a common parameter, e.g., a luminous density. The reflection factor and the distance are separate from each other by the measurement and knowledge of a second light distribution. Then, the distance from the illumination device is precisely ascertained for each pixel, so that a three-dimensional representation of the object is generated. A distance can be understood both as a longitudinal distance between the illumination device and an object and a distance to a reference axis, e.g., the main radiation direction. This is able to be represented as a position in space, as polar coordinates, for example. In this context, the distance can be seen as an important feature that can also be exploited by other functions, such as for the initiation of an object-tracking measurement. A relative movement is easily measurable with the aid of a camera. The knowledge of the absolute position is important for an adjustment of airbag-firing times, etc.; in other words, in the approach presented here, the distance measurement makes it possible to ascertain an initial value for a personal protection means. Through the measurement of a relative movement, it is then possible to determine the absolute position and to adapt the actuation of the personal protection means.

The three-dimensional representation is then compared with possible positions and a possible size of the persons to be detected in order to ascertain a seat occupancy in the vehicle. The belt detection in the vehicle takes place using classic means, for instance by evaluating 2D image information; however, it can additionally be supported by the 3D measuring information, for instance when selecting possible measuring ranges.

If an exemplary embodiment includes an 'and/or' linkage between a first feature and a second feature, then this means that the exemplary embodiment according to one specific embodiment includes both the first feature and the second feature, and according to other further specific embodiments, includes only the first feature or only the second feature.

What is claimed is:

1. A method for performing an operation based on a detection of an object in a motor vehicle, the motor vehicle including an illumination device in the motor vehicle by which the object can be illuminated at different illumination settings and an image-recording device in the motor vehicle by which images of the object are recordable, the method comprising the following steps:

illuminating, by the illumination device in the motor vehicle at a first illumination setting of the different illumination settings, the object in the motor vehicle, the illumination device, at the first illumination setting, illuminating the object from a first direction, a first shading being cast on a surface of the object by the illuminating of the object from the first direction;

obtaining, using the image-recording device in the motor vehicle, a first image of the object including the first shading cast on the surface of the object, the obtaining of the first image being performed during the illuminating of the object from the first direction;

illuminating, by the illumination device in the motor vehicle at a second illumination setting of the different illumination settings, the object in the motor vehicle, the illumination device, at the second illumination setting, illuminating the object from a second direction different from the first direction, a second shading being cast on the surface of the object by the illuminating of the object from the second direction;

obtaining, using the image-recording device in the motor vehicle, a second image of the object including the second shading cast on the surface of the object, the obtaining of the second image being performed during the illumination of the object from the second direction;

processing the first image and the second image to identify the first shading cast on the surface of the object and the second shading cast on the surface of the object;

generating, using the identified first shading cast on the surface of the object and the identified second shading cast on the surface of the object, a 3D model of the object;

detecting, using the generated 3D model, a surface structure of the object and/or a position of the object; and based on the detected surface structure of the object and/or the detected position of the object, controlling a restraint in the motor vehicle and/or outputting a warning.

2. The method as recited in claim 1, wherein during the illuminating of the object at the first illumination setting and the illuminating of the object at the second illumination setting, the illumination device illuminates the object using visible light.

3. The method as recited in claim 1, wherein during the illuminating of the object at the first illumination setting and the illuminating of the object at the second illumination setting, the illumination device illuminates the object using infrared light.

4. The method as recited in claim 1, wherein in the detecting step, the surface structure of the object is detected using the 3D model, and wherein based on the detected surface structure of the object, the restraint is controlled and/or the warning is output.

5. The method as recited in claim 1, wherein in the detecting step, the position of the object is detected using the 3D model, and wherein based on the detected position of the object, the restraint is controlled and/or the warning is output.

6. The method of claim 1, further comprising:
illuminating, by the illumination device in the motor vehicle at a third illumination setting of the different illumination settings, the object in the motor vehicle, the illumination device, at the third illumination setting, illuminating the object from a third direction different from the first direction and different from the second direction, a third shading being cast on the surface of the object by the illuminating of the object from the third direction; and
obtaining, using the image-recording device in the motor vehicle, a third image of the object including the third shading cast on the surface of the object, the obtaining of the third image being performed during the illumination of the object from the third direction;
wherein the processing further includes processing the third image to identify the third shading cast on the surface of the object, and the generating further includes generating the 3D model using on the identified third shading cast on the surface of the object.

7. The method as recited in claim 1, wherein the object in the motor vehicle is on a seat of the motor vehicle.

8. The method of claim 4, wherein the processing includes using at least one brightness-threshold value to ascertain a first brightness characteristic representing the first shading cast on the surface of the object, and the surface structure of the object is detected based on the first brightness characteristic.

9. The method of claim 8, wherein the processing includes using the at least one brightness-threshold value to ascertain a second brightness characteristic representing the second shading cast on the surface of the object, and the surface structure of the object is detected further based on the second brightness characteristic.

10. The method of claim 4, wherein the processing includes determining a distance between the object and the illumination device of the vehicle in a pixel-wise manner, and the surface structure of the object is detected based on the determined distance.

11. The method of claim 4, wherein the method further comprises:
evaluating the detected surface structure of the object; and
based on the evaluation, detecting a vehicle passenger as the object.

12. The method of claim 4, wherein the method further comprises:
evaluating the detected surface structure of the object; and
based on the evaluation, detecting a child seat as the object.

13. A system for performing an operation based on a detection of an object in a motor vehicle, the system comprising:
an illumination device in the motor vehicle that is settable to different illumination settings and by which the object can be illuminated at the different illumination settings the illumination device configured to, at a first illumination setting of the different illumination settings, illuminate the object in the motor vehicle from a first direction, a first shading being cast on a surface of the object by the illuminating of the object from the first direction, the illumination device further configured to, at a second illumination setting of the different illumination settings, illuminate the object in the motor vehicle from a second direction different from the first direction, a second shading being based on the surface of the object by the illumination of the object from the first direction;
an image-recording device in the motor vehicle by which images of the object are recordable; and
processing circuitry interfacing with the image-recording device, wherein the processing circuitry is configured to:
obtain, using the image-recording device in the motor vehicle, a first image of the object including the first shading cast on the surface of the object, the obtaining of the first image being performed during the illuminating of the object from the first direction;
obtain, using the image-recording device in the motor vehicle, a second image of the object including the second shading cast on the surface of the object, the obtaining of the second image being performed during the illumination of the object from the second direction;
process the first image and the second image to identify the first shading cast on the surface of the object and the second shading cast on the surface of the object;
generate, using the identified first shading cast on the surface of the object and the identified second shading cast on the surface of the object, a 3D model of the object;
detect, using the generated 3D model, a surface structure of the object and/or a position of the object; and
based on the detected surface structure of the object and/or the detected position of the object, control a restraint in the motor vehicle and/or output a warning.

14. A non-transitory computer-readable medium on which are stored instructions that are executable by a processor and that, when executed by the processor, cause the processor to perform a method for performing an operation based on a detection of an object in a motor vehicle, the motor vehicle including an illumination device in the motor vehicle by which the object can be illuminated at different illumination settings and an image-recording device in the motor vehicle by which images of the object are recordable, the method comprising the following steps:
illuminating, by the illumination device in the motor vehicle at a first illumination setting of the different illumination settings, the object in the motor vehicle, the illumination device, at the first illumination setting, illuminating the object from a first direction, a first shading being cast on a surface of the object by the illuminating of the object from the first direction;
obtaining, using the image-recording device in the motor vehicle, a first image of the object including the first shading cast on the surface of the object, the obtaining of the first image being performed during the illuminating of the object from the first direction;
illuminating, by the illumination device in the motor vehicle at a second illumination setting of the different illumination settings, the object in the motor vehicle, the illumination device, at the second illumination setting, illuminating the object from a second direction different from the first direction, a second shading being cast on the surface of the object by the illuminating of the object from the second direction;
obtaining, using the image-recording device in the motor vehicle, a second image of the object including the second shading cast on the surface of the object, the obtaining of the second image being performed during the illumination of the object from the second direction;
processing the first image and the second image to identify the first shading cast on the surface of the object and the second shading cast on the surface of the object;

generating, using the identified first shading cast on the surface of the object and the identified second shading cast on the surface of the object, a 3D model of the object;

detecting, using the generated 3D model, a surface structure of the object and/or a position of the object; and based on the detected surface structure of the object and/or the detected position of the object, controlling a restraint in the motor vehicle and/or outputting a warning.

\* \* \* \* \*